United States Patent
Borthakur et al.

(10) Patent No.: US 11,860,871 B2
(45) Date of Patent: Jan. 2, 2024

(54) CONTINUOUS DELIVERY OF DATABASE QUERIES FOR APPLICATIONS BASED ON NAMED AND VERSIONED PARAMETERIZED DATABASE QUERIES

(71) Applicant: Rockset, Inc., San Mateo, CA (US)

(72) Inventors: Dhruba Borthakur, Sunnyvale, CA (US); Venkat Venkataramani, Palo Alto, CA (US); Shruti Bhat, Newark, CA (US); Scott William Morris, San Francisco, CA (US); Aditi Dhar, Redwood City, CA (US); Kshitij Wadhwa, San Mateo, CA (US)

(73) Assignee: Rockset, Inc., San Mateo, CA (US)

( * ) Notice: Subject to any disclaimer, the term of this patent is extended or adjusted under 35 U.S.C. 154(b) by 278 days.

(21) Appl. No.: 17/199,232

(22) Filed: Mar. 11, 2021

(65) Prior Publication Data

US 2022/0292097 A1   Sep. 15, 2022

(51) Int. Cl.
*G06F 16/2453* (2019.01)
(52) U.S. Cl.
CPC .............. *G06F 16/24542* (2019.01)
(58) Field of Classification Search
None
See application file for complete search history.

(56) References Cited

U.S. PATENT DOCUMENTS

| | | | |
|---|---|---|---|
| 10,963,438 B1* | 3/2021 | Dong | G06F 16/217 |
| 2009/0100004 A1* | 4/2009 | Andrei | G06F 16/2453 |
| 2010/0192006 A1* | 7/2010 | Gharat | G06F 11/3688 |
| | | | 714/E11.023 |
| 2012/0197865 A1* | 8/2012 | Koch | G06F 16/24539 |
| | | | 707/E17.017 |
| 2015/0100566 A1* | 4/2015 | Ramaswami | G06F 16/24542 |
| | | | 707/718 |
| 2017/0098009 A1* | 4/2017 | Srinivasan | G06F 16/9024 |
| 2018/0046675 A1* | 2/2018 | Zhou | G06F 16/24549 |
| 2018/0060388 A1* | 3/2018 | Goussev | G06F 16/24535 |
| 2018/0129715 A1* | 5/2018 | Standefer, III | G06F 16/24575 |
| 2020/0097498 A1* | 3/2020 | Tang | G06F 11/1464 |

* cited by examiner

*Primary Examiner* — Augustine K. Obisesan
(74) *Attorney, Agent, or Firm* — Fenwick & West LLP (57) ABSTRACT

A system stores associates a database query with a name and stores versions of the database query. The system allows applications to execute a specific version of the database query by specifying the name of the database query and a version identifier. For example, the database query may be exposed as an endpoint of a REST API and invoked using calls to the REST API. This allows the applications to be designed without including the query definition within the code of the application. Continuous delivery of database query is performed by creating a new version of the database query that are tested using applications in a test environment. Once the new version of a database query meets test criteria, the new version of the database query is executed by applications running in production environment by sending API requests that identify the query name and the new version.

20 Claims, 6 Drawing Sheets

CONTINUOUS DELIVERY OF DATABASE QUERIES FOR APPLICATIONS BASED ON NAMED AND VERSIONED PARAMETERIZED DATABASE QUERIES

BACKGROUND

This disclosure relates generally to execution of database queries by applications and more specifically to continuous delivery of parameterized database queries for applications by storing named and versioned parameterized database queries.

Enterprises often use databases, for example, relational databases for searching across structured data. Users execute applications that invoke database queries that process the data stored in the databases. For example, an application written in a programming language such as JAVA may include database queries. The instructions of the application are typically compiled to generate executable code for the application. The application may be executed on a client device or executed on a server and invoked by a client device, for example, via a browser application.

Changes to application architecture or design often require upgrades to the underlying database schema as well as database queries used for processing the data. Conventional applications using database queries are difficult to upgrade when a database schema is upgraded or the database queries are upgraded. For example, if a database query is upgraded, a developer typically reviews the application code to identify all instances of invocation of the database query to modify the application code. The application code needs to be recompiled and the application reinstalled and redeployed with the upgraded database query. This is a cumbersome process since debugging and modifying applications can be complicated.

Furthermore, current architecture/design of client applications that embed database queries in the client application requires a library on the client device linked with the application to process client-side database instructions. The library includes instructions to allow the client application to interface with the online system or the database system for providing the query for processing and receiving the results. For example, if the client application uses JAVA code, the client application may have to be combined with JDBC (JAVA database connectivity) driver library and for programming languages such as C and C++ an ODBC (open database connectivity) driver may be used. Use of a library with applications has maintenance overhead and also makes the application more complex. For example, in case of upgrades of the database, the client application may have to be rebuilt and linked with a newer version of the library and reinstalled. Such upgrades result in downtime of the application since the application may not be usable when the application code is being rebuilt or reinstalled.

Furthermore, when a database system receives a database query sent by an application the database system is expected to execute the database query and return results in almost real time since an end user is typically waiting for the results. As a result, the database query may not be optimized. For example, detailed analysis of a database query may reveal that use of a specific index may improve performance of the database query. However, since creation of an index takes time, the database system executes the database query using a suboptimal execution plan rather than spend the time to create the index and use an optimized execution plan. As a result, the above architecture and design of applications may also result in suboptimal execution of database queries.

There are other issues with the conventional design and architecture of the client application. For example, applications that embed database queries are more vulnerable to attacks from malicious users that are trying to access information from the database. A malicious user can launch an SQL (structured query language) injection attack through unauthorized modification of the queries of the application, thereby accessing more data from the database than the client application is authorized to access. As a result conventional applications based on database queries are less secure and open to malicious attacks.

SUMMARY

The above and other issues are addressed by a computer-implemented method, computer system, and computer readable storage medium for providing REST endpoints for named versioned parameterized database query. The system treats each version of a database query as immutable and stores any modifications to the database query as new versions. The system stores each version of the database query in association with the database query name, an identifier for the version, and the definition of the database query for that version. Applications can access specific versions of the database query by specifying the name and a value identifying the version. This allows applications to be decoupled from the definitions of the query, thereby facilitating continuous integration and continuous delivery of upgrades to database queries. Furthermore, versions of the database query can be optimized before the version is provided to client applications via an endpoint, thereby improving the efficiency of execution of the database query. Each version of the database query is associated with a URL and an application can execute a specific version of the database query via the URL. As a result, the API (application programming interface) for executing the database queries according to various embodiments can be invoked by applications that are based on any of a plurality of programming language, so long as the programming language allows the application to access a URL via HTTP protocol or any equivalent protocol. Furthermore, the application is not required to be linked to any database specific client-side library for executing the database queries, thereby making the installation, deployment, and upgrade of applications simpler.

According to an embodiment, the system stores a first version of a database query. The system receives a first REST API request for executing the first version of database query from a production instance of an application. The first REST API request specifies the name of the database query, an identifier for the first version, and parameters of the database query if applicable. The system processes the first version of the database query in response to the first REST API request. The system further receives a modification to the database query. The system stores the modified database query as a second version of the database query. The system receives one or more REST API requests for testing the second version of the database query. If the second version of the database query passes a test criterion, the system promotes the second version of the database query for use with production instances of the application. The system receives a second REST API request from the production instance of the application. The second REST API request specifies the name of the database query, an identifier for the second version, and parameters of the database query if applicable. The system processes the second version of the database query in response to receiving the second REST API request. Although the method is described in connection with REST APIs, other embodiments may user other types of API requests.

According to an embodiment, the system stores a plurality of versions of a parameterized database query. The system receives a modified definition of the parameterized database query. The system stores the modified parameterized database query as a new version of the parameterized database query in association with a value identifying the version. The system provides one or more versions of the parameterized database query as endpoints for REST API requests. The system receives a REST API request from an application. The REST API request is provided via a URL specifying (1) a particular name of the database query, (2) a particular value identifying a version, and (3) one or more parameter values for the parameterized database query. The system accesses a particular version of the database query based on matching of the particular name of the database query and the particular value identifying the version. The system executes the particular version of the database query in response to receiving request the application using the one or more parameters specified by the REST API request.

The system may store metadata describing queries as records, each record including attributes comprising: the database query name; a generated identifier for a version of the database query; a user defined tag for the database query; and a query text including the query definition.

Embodiments of a computer readable storage medium store instructions for performing the steps of the above method. Embodiments of the computer system comprise one or more computer processors and a computer readable storage medium store instructions for performing the steps of the above method.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

The teachings of the embodiments can be readily understood by considering the following detailed description in conjunction with the accompanying drawings.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments allow applications to execute database queries by specifying a name or an identifier for the database queries in the application. An online system stores a mapping from database query identifiers to database queries. An API request is received by the online system that identifies the database query by its query identifier. Multiple versions of a database queries may be stored, each associated with a version identifier. The API request may specify a version identifier along with a database query identifier to refer to a specific version of the database query.

According to an embodiment, the system exposes an end point for versioned and parameterized database queries. Applications may access the end point by sending API requests, for example, REST API requests. For example, the database query may be exposed using a URL and applications may execute a database query by specifying the URL for the database query. The URL identifies the name of the database query, a version of the database query and may provide parameters for the database query if the database query is parameterized. Applications that use the database queries do not include the query definition but only identify the database query using a query name and a version identifier.

A version of a database query is treated as immutable by the system. Accordingly, once a version of the database query is created, the query definition for that version is not modified by the system. If the database query is modified, a new version of the database query is created. A version identifier for the new version is generated. A user can provide a user defined tag to identify the version instead of using the automatically generated version identifier.

Versioning of the database queries simplifies development of database queries as well as deployment of database queries for applications. The system facilitates continuous integration (CI) and continuous delivery (CD) of database queries by enabling deployment of changes to database queries to applications with minimum downtime of the applications and with minimal changes to the application code. Furthermore, the database queries maybe optimized for execution before being deployed.

The query definition may be updated by the online system without affecting the applications that request execution of the database queries. As a result, queries can be upgraded and tested using applications in a testing or staging environment before the upgraded query is made available to applications in a production environment. Furthermore, such upgrades may be made without modifying the application code. This allows continuous delivery of database query upgrades to applications without requiring modifications to the applications. Furthermore, applications are able to execute the database queries without requiring a client-side library that is used for handling database query requests. This is so because the client application can execute a database query by simply sending a request that identifies the query, for example, an HTTP (hypertext transfer protocol) request that specifies the query identifier. The client application does not include the query definition. As a result invocation of database queries is simplified for the client applications.

Embodiments store a query definition as a block of code specified using a database query language that may be referred to herein as a query lambda. A query lambda may be executed by client applications using REST APIs (REpresentational State Transfer application programming interfaces). Query lambdas allow client applications to query data without needing any special client-side software and without needing to establish and manage database sessions or connections. A client application can simply hit a REST endpoint to execute a database query.

Embodiments allow query lambdas to be created and updated using a console or by using the REST API directly. A query lambda is tied to a specific query text and parameter set. The system allows developers to set default values for query parameters. Alternatively one or more query parameters may be specified as mandatory for each execution.

The system maintains a version history for a query lambda, thereby allowing easier development of query lambdas. Any update to a query lambda automatically creates a new version, which allows developers to build and test changes without affecting production queries.

Furthermore, the system tracks and provides execution metrics for each query lambda, for example, time of last execution, user ID associated, time of last execution error and associated error messages.

As a result, embodiments improve upon existing technology of building applications that request execution of database queries to access data stored in databases. Conventional designs of applications embed database queries in the application code, thereby requiring the application code to be modified when there are changes to database queries. Accordingly, the application may have to be recompiled and reinstalled. In contrast, the use of query lambdas allows database queries to be modified without requiring changes to the application if the interface of the database queries is not modified. As a result, there is less maintenance overhead when handling applications. For example, a client application may be deployed in hundreds of thousands of client devices. Conventional techniques require all hundreds of thousands of installations of the client applications to be upgraded when the database queries are upgraded. The disclosed techniques allow the client applications to continue to be used without modifications when a database query invoked by the client application is upgraded. As a result, the disclosed techniques simplify continuous delivery of database query upgrades.

Furthermore, conventional architecture/design of applications requires a client-side library on the client device that is linked with the application to process client-side instructions. In contrast, the disclosed techniques allow the application to execute without requiring a client-side library, thereby reducing the maintenance overhead of the applications, for example, by making upgrades of application simpler. Furthermore, the footprint of the client application is reduced due to use of fewer client-side libraries.

Applications written in any programming language or system are able to execute the database queries using the disclosed system, so long as the application can execute HTTP requests. This simplifies the process of developing and testing the database queries since the database queries are decoupled from the applications and can be developed and tested independent of the applications and reused across multiple applications that may be written in different programming languages. It is possible to execute a new client application written in a new language, even if the programming language was never tested with the database query.

Furthermore, conventional techniques that embed database queries in the application are vulnerable to security attacks from malicious users, for example, SQL injection attacks. A malicious attacker can modify the client application to change the database query to retrieve more data than was originally intended. For example, if a malicious actor modifies a database query "select address from table EMPLOYEE where employee_id=?" to a new database query "select * from table EMPLOYEE" and executes the application the modified database query may expose all columns of all rows of the table EMPLOYEES. The disclosed techniques decouple database queries from the application, thereby making the applications impervious to SQL injection attacks or other types of attacks that exploit vulnerabilities in database queries. Since there is no query definition stored in a client application, a malicious actor is unable to modify the client application to again unauthorized access to the data stored in a database. As a result, the disclosed techniques improve the security of applications.

Furthermore, conventional architectures of applications that embed database queries in the application make it difficult to optimize queries since the result must be returned within a short time, for example, within few milliseconds. In contrast, the disclosed techniques allow the database queries to be optimized before being deployed. New query versions are created and stored and optimized before being deployed to applications. This improves the execution performance of the database queries and also the performance of the applications invoking the database queries.

System Environment

Figure 1:
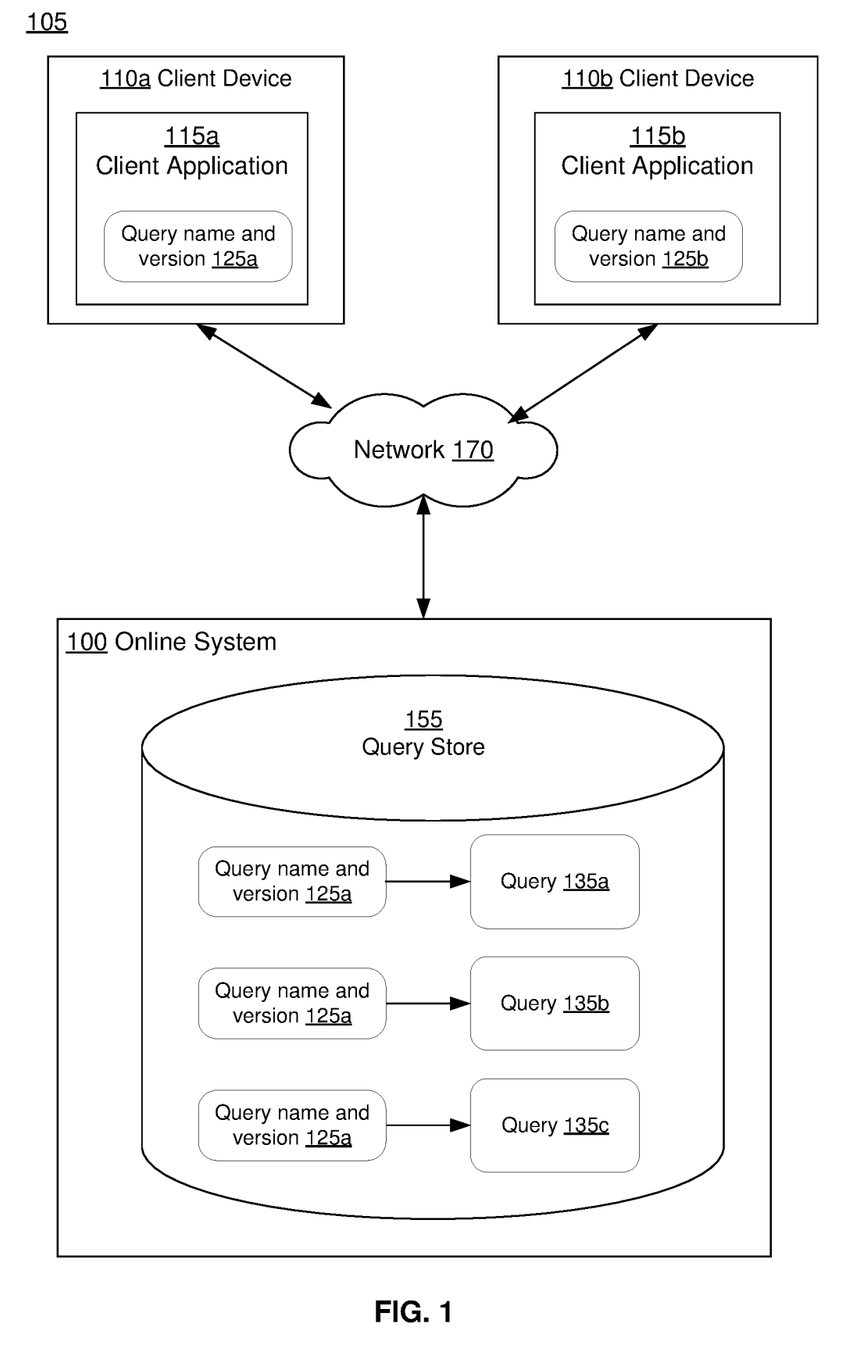
FIG. 1 is a block diagram of a system environment in which an online system operates, in accordance with an embodiment.

FIG. 1 is a block diagram of a system environment 105 in which an online system operates, in accordance with an embodiment. The system environment 105 comprises an online system 100, one or more client devices 110, and a network 170. The system environment 105 may include multiple client devices 110. Other embodiments may have more of fewer systems within the system environment 105. Functionality indicated as being performed by a particular system or a module within a system may be performed by a different system or by a different module than that indicated herein.

FIG. 1 and the other figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "110" in the text refers to reference numerals "110a" and/or "110n" in the figures).

The online system 100 includes a query store 155 that stores database queries. The database queries may be specified using a query language, for example, SQL (structured query language) but are not limited to SQL syntax.

The query store 155 maps query identifiers 125 to database queries 135. For example, query identifier 125a represents database query 135a, query identifier 125b represents database query 135b, and query identifier 125c represents database query 135c. A client application 115 running on a client device identifies a database query using the query identifier 125. For example, client application 115a identifies the database query 135a using the query identifier 125a and client application 115b identifies the database query 135b using the query identifier 125b. Accordingly, the client applications 115 do not embed the query definition in the client application code. The client application code includes the query identifier 125. As a result, the query definition 135 may be modified without requiring changes to the client application.

A client application 115 can refer to a modified database query by using the appropriate query identifier 125. The query identifier may be obtained by the client application using a configuration file or a system parameter, thereby making the client application code independent of the database query definition. This allows client applications to be upgraded to new query definition without having to make significant changes to the client application. If the client application is designed appropriately, the client application may be upgraded without requiring any changes to the client application code. For example, the client application may be configured so that it executes the latest version of a database query. The database query may be upgraded to a new version and the client application automatically starts executing the new version of the database query.

In some embodiments, the query optimization module 260 generates an execution plan for a version of the database query and stores the execution plan in association with the version identifier, for example, as part of the record storing information describing the query version. In response to receiving an API request from an application, for example, a REST API request specifying the query name and version identifier, the online system 100 accesses the execution plan of the query and executes it. This allows the online system to reuse the execution plan every time a request to execute that version of the database query is received. This makes execution of the database query more efficient comparing to a process that generates the execution plan after receiving the database query from the application since there is no overhead of generating the execution plan. Furthermore, the execution plan can be optimized before the database query is made available for user by client applications. For example, the system may collect up-to-date statistics of tables processed by the database query so that a cost based optimizer can generate an optimized execution plan. Furthermore, the system may analyze the database query to determine if any indexes will speed up the execution of the database query. The system generates the required indexes and generates an optimized execution plan that uses the generated indexes.

In an embodiment, the online system 100 allows client applications to invoke database queries using REST APIs. Accordingly, the client device executes the database query by sending a request, for example, an HTTP request that specifies the query identifier as an argument. A database query has a URL (uniform resource locator), for example, an HTTP address that can be used by an application to execute the query. Accordingly, a client application can execute the query by sending a request to the URL of the query. Furthermore, sending the HTTP request does not require a client-side database library. Any client application, for example, the internet bowser that can execute an HTTP request is able to execute the database query remotely. The online system 100 executes the database query and returns the result as a response to the request sent by the client application. This allows client applications to query data without needing any special client-side library and without needing to establish and manage database sessions or connections.

In an embodiment, the online system 100 provides a client interface to allow users to update the database queries. A database query has a specific query text and parameter set, and developers can set default values for query parameters or make them mandatory for each execution.

In an embodiment, the data processed by the database queries is stored in a relational database but could be other type of database, for example, a key-value store. A system based on a key-value store that may be used to store data is described in U.S. patent application Ser. No. 16/160,477, filed on Oct. 15, 2018, which is hereby incorporated by reference in its entirety.

A client device 110 is a computing device such as a personal computer (PC), a desktop computer, a laptop computer, a notebook, or a tablet PC. The client device 110 can also be a personal digital assistant (PDA), mobile telephone, smartphone, wearable device, etc. The client device 110 can also be a server or workstation within an enterprise data-center. The client device executes a client application 115 for interacting with the search system 100, for example, a browser. Although, FIG. 1 shows two client devices, the system environment 105 can include many more client devices 110.

The network 170 enables communications between various systems within the system environment 105, for example, communications between the client device 110 and the search system 100, communications between the third party system 130 and the cloud storage system 120, and so on. In one embodiment, the network uses standard communications technologies and/or protocols. The data exchanged over the network can be represented using technologies and/or formats including, the HTML, the XML, JSON, and so on.

System Architecture

Figure 2:
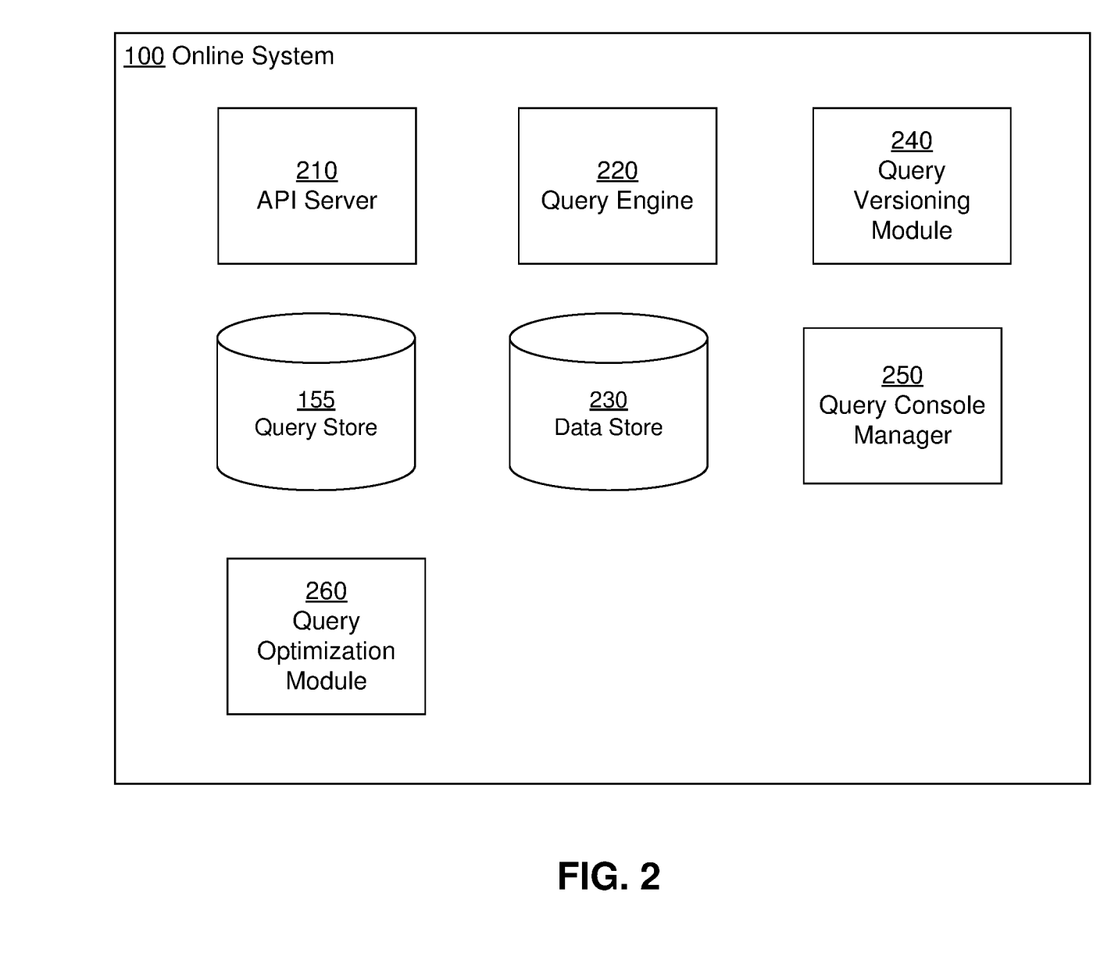
FIG. 2 shows the system architecture of the online system, in accordance with an embodiment.

FIG. 2 shows the system architecture of an online system, in accordance with an embodiment. The online system 100 comprises an API server 210, a query engine 220, a query store 155, a data store 230, a query versioning module 240, and a query optimization module 260. Other embodiments of a search system 100 may include more of fewer modules.

The API server 210 receives requests to execute database queries and executes them. In an embodiment, the API server exposes a REST end point for a database query. the API server 210 receives REST API requests directed to the REST end points and executes them. For example, the online system 100 associates each database query with a URL and the API server receives a request sent by a client application via the URL.

The URL corresponding to a database query includes query identifier for uniquely identifying the database query. For example, the URL may specify the query name and query version for identifying the database query. The API sever 210 receives the API request, identifies the database query identified by the API request, and invokes the query engine 150 for executing the database query. If the database query is parameterized, the API request for executing the database query specifies the query parameters. The API sever 210 extracts the query parameters from the API request, for example, by parsing the URL if the API request is sent via a URL. The API server 210 provides the parameters to the query engine 150 for executing the database query. The API server 210 receives the result of the query and provides the results to the application that sent the API request.

The API sever 210 may receive requests from client applications that may be written in different programming languages, so long as the application is configured to access URLs using HTTP protocols. Accordingly, the REST API interface provided by the API server allows client applications to access the database queries independent of the programming language used to write the application. For example, the API sever 210 may receive and process a request from a client application written in programming language P1 to execute a database query Q1. Next the API sever 210 may receive and process a request from a client application written in programming language P2 to execute a database query Q1 or any other database query Q2.

The query engine 150 receives request to execute database queries and executes them. In an embodiment, the query engine receives query identifiers for identifying the queries, for example, a query name and a query version. The query engine 150 may also receive parameters of the database query. The query engine 150 accesses the query definition for the identified database query from the query store 155 and executes the database query.

The query store 155 stores query definitions for database queries. In an embodiment, the query store 155 maps information identifying a query to query definitions. For example, the query store may store a query name, a query version, and a query definition for database queries.

The query versioning module 240 manages versions of queries. A database query identified by a query name may have multiple query versions. In an embodiment, every time a query is modified, the query versioning module 240 generates a new query version identifier. The query versioning module 240 stores the new version of the query in the query store 155.

The query console manager 250 configures and presents a user interface to users, for example, a console for allowing users such as developers to build queries, modify queries, execute queries, and so on. A developer may interact with the online system via a user interface or programmatically using the REST APIs. The user may provide query definitions, user defined version tags, and so on, using the console.

The query optimization module 260 analyzes the performance of a version of the database query and performs actions for optimizing the database query. The query optimization module 260 generates statistics used for optimization of the database query. The query optimization module 260 uses the statistics to generate an optimized execution plan for the database query, for example, using cost based optimization techniques. The query optimization module 260 may make recommendations to a developer or database administrator for optimizing the database query. Alternatively, the query optimization module 260 may automatically take appropriate actions. For example, the query optimization module 260 may determine that the query performance may be improved by adding one or more indexes to a table processed by the query. The query optimization module 260 makes recommendation to create the indexes to a developer. Alternatively, the query optimization module 260 executes database commands that create the required indexes to improve the query performance.

Processes

Figure 3:
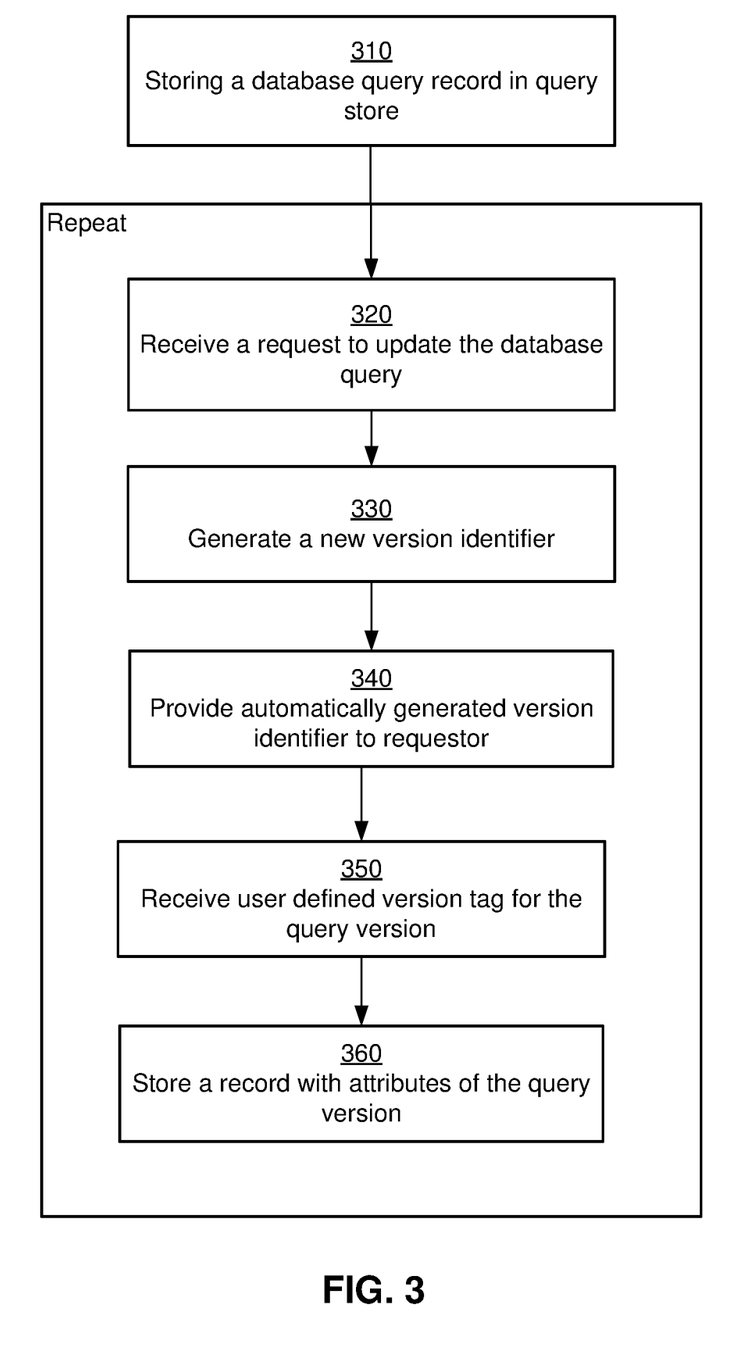
FIG. 3 is a flowchart of the process of development of a database query, in accordance with an embodiment.

FIG. 3 is a flowchart of the process of development of a database query, in accordance with an embodiment. The steps shown in this process can be executed in an order different from those shown in the flowcharts. Furthermore, various steps can be executed by modules other than those indicated herein.

The online system 100 receives and stores 310 a database query, for example, in the query store. The online system 100 may receive a query definition for a new database query. The query versioning module 240 generates an initial version identifier for the database query. The online system 100 also receives a query name for the database query. The online system 100 stores a record in the query store with information describing the query including the query name, the initial query version, and the query definition.

The online system 100 repeats the following steps 320, 330, 340, 350, and 360 for each modification to the database query that may be received by the online system. The modifications to the database query may be performed by a developer using a console of the online system 100.

Each version of the database query is immutable. Accordingly, whenever a query is modified, it is stored as a new version. The online system 100 does not allow modifications to an existing version of the database query. The online system 100 receives 320 a request to update the database query. The request to update the database query provides a new query definition for the database query.

The query versioning module 240 generates 330 a version identifier for a new version of the database query. The version identifier is an automatically generated value that uniquely identifies the version of the query. The query name and the query version identifier uniquely identify the query definition that is received from the user. For example, query versioning module 240 may maintain a counter and increment the counter for each new version of the query to generate the query version identifier.

The online system 100 provides 340 the automatically generated query version identifier of the database query to client device or application that provided the query definition. The online system 100 receives 350 a user defined tag for the version. The user defined tag is provided by the user, for example, a developer to be able to identify the query version using a user friendly identifier. For example, the user defined tag may describe a feature of the new version of the query. The online system 100 stores 360 a record in a metadata table describing the query version. The record may store the query name, the automatically generated version identifier, the user defined version tag, and query text representing the query definition.

Figure 4:
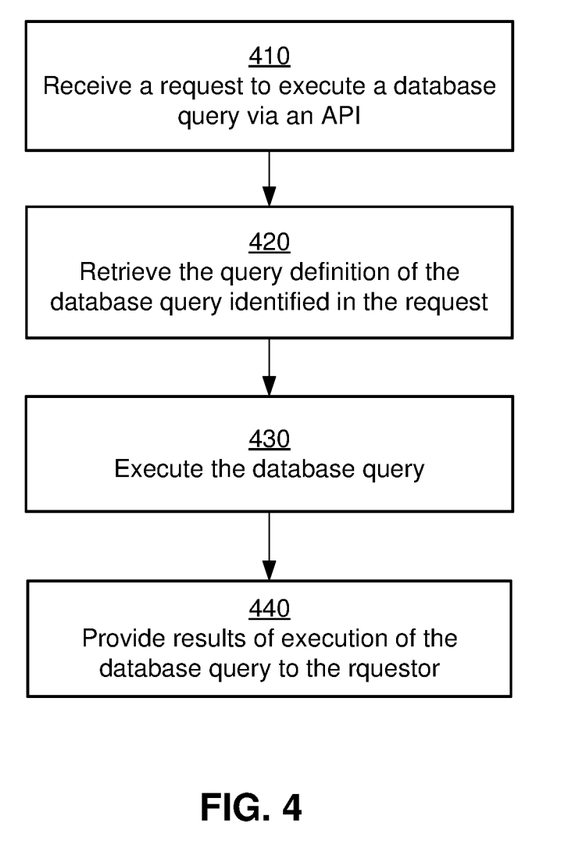
FIG. 4 shows a flowchart of the process for executing queries, in accordance with an embodiment.

FIG. 4 shows a flowchart of the process for executing queries, in accordance with an embodiment. The steps shown in this process can be executed in an order different from those shown in the flowcharts. Furthermore, various steps can be executed by module other than those indicated herein.

The online system 100 receives 410 a request to execute a database query from a client device. The request may be received via a REST API. The request specifies a name of a database query, a version identifier of the database query, and one or more parameters for the database query. The version identifier may be the automatically generated version identifier or a user defined tag.

The query engine 220 retrieves 420 the query definition of the database query that matches the name and the version identifier from the query store 155. In an embodiment, the query engine 220 retrieves a stored previously optimized execution plan for executing the database query. The query engine executes 430 the database query by providing the one or more parameters as input. The query engine provides 440 the result of execution of the query to the client device that sent the API request.

Figure 5:
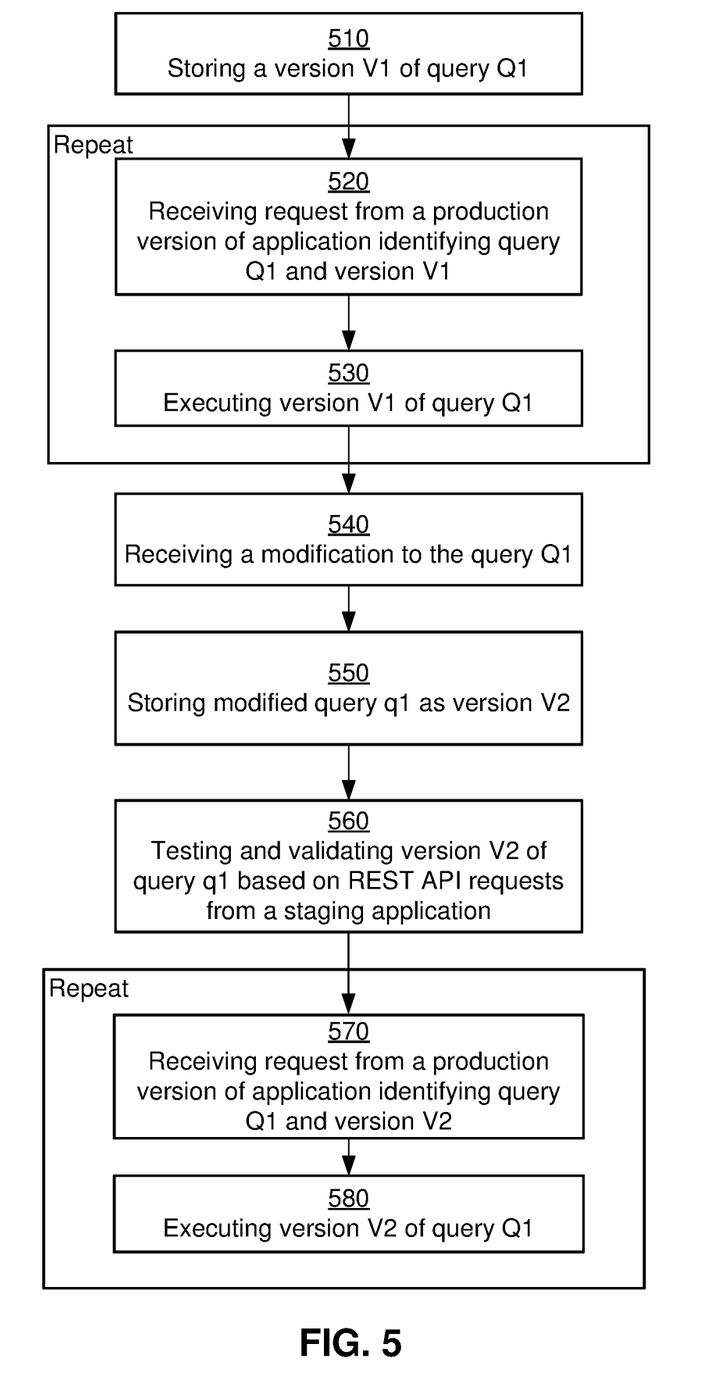
FIG. 5 shows a flowchart of the process for continuous delivery of database queries for applications, in accordance with an embodiment.

FIG. 5 shows a flowchart of the process for continuous delivery of database queries for applications, in accordance with an embodiment. The steps shown in this process can be executed in an order different from those shown in the flowcharts. Furthermore, various steps can be executed by module other than those indicated herein.

API requests mentioned in the following description of FIG. 5 may be REST API requests or another type of API request that specifies the query name, query version, and any parameters of the query. The online system 100 stores 510 in the query store 155, a version V1 of a database query identified by a name Q1.

The online system may repeat the steps 520 and 530 multiple times. The API server 210 receives 520 an API request from a production version of an application. The API request may be a REST API request received via a REST end point. The API request specifies (1) the queryname Q1 (2) the query version V1, and (3) one or more parameters of the database query. The query version may be specified using the automatically generated version identifiers or using a user defined version tag. The query engine 220 executes the version V1 of the database query Q1 in response to the received request and provides the result to the client device or application that sent the API request.

The online system 10 receives 540 a request to modify the query. The request provides a modified query definition of query Q1. The query versioning module 240 generates a new version V2 of the database query Q1 and stores 550 the modified database query as version V2 of query Q1 in the query store 155.

The online system performs 560 testing and validation of the version V2 of the database query Q1 via API requests received from a staging version of the application. The testing and validation may comprise executing the database query with various parameter values, executing the database query with different data stored in the tables being queried, and so on. The testing of the database query may be performed using client devices configured for performing testing that run a test instance of the application. The database query may be tested using different applications configured to execute the same database query using REST APIs. The database query may be tested under different load conditions, for example, the same database query may be sent multiple times or a set of different database queries including the version V2 of database query Q1 may be executed on the database, The API request for testing the version V2 of the database query Q1 identifies the database query by specifying the database query name Q1 and version V2.

Responsive to the version V2 passing the test/validation criteria of the staging version of the application, the online system makes the version V2 of the database query Q1 available for production applications. The criteria for passing the test may comprise comparing the test results of execution of the queries with predetermined results. If the results of executing the query match the predetermined results, the database query is determined to have passed the test criteria. If one or more results of execution of the query do not match the predetermined results, a failure to pass the tests may be returned. A developer may investigate the database query text to determine the cause of the failure. The developer may modify the query text if necessary. The process of testing is continued until the database query passes the test criteria.

The online system further repeats steps 570 and 580. The API server 210 receives 570 an API request from the production version of an application. The API request specifies (1) the query name Q1 (2) the query version V2. The query engine 240 executes 580 the version V2 of the database query Q1 in response to received request from the production version of the application and provides the result to the requestor. Accordingly, the production version is migrated from version V1 of query Q1 to version V2 of query Q1 by changing the API request to the online system.

In an embodiment, the system optimizes the query version V2 before making it available to a production system for execution. For example, the system may generate statistics describing the tables processed by the version V2 of the database query. The system generates an execution plan optimized based on the generated statistics for the version V2 of the database query. In an embodiment, the system generates an index of a table processed by the version V2 of the database query and generates an execution query plan using the generated index for the version V2 of the database query.

Architecture of Computer

Figure 6:
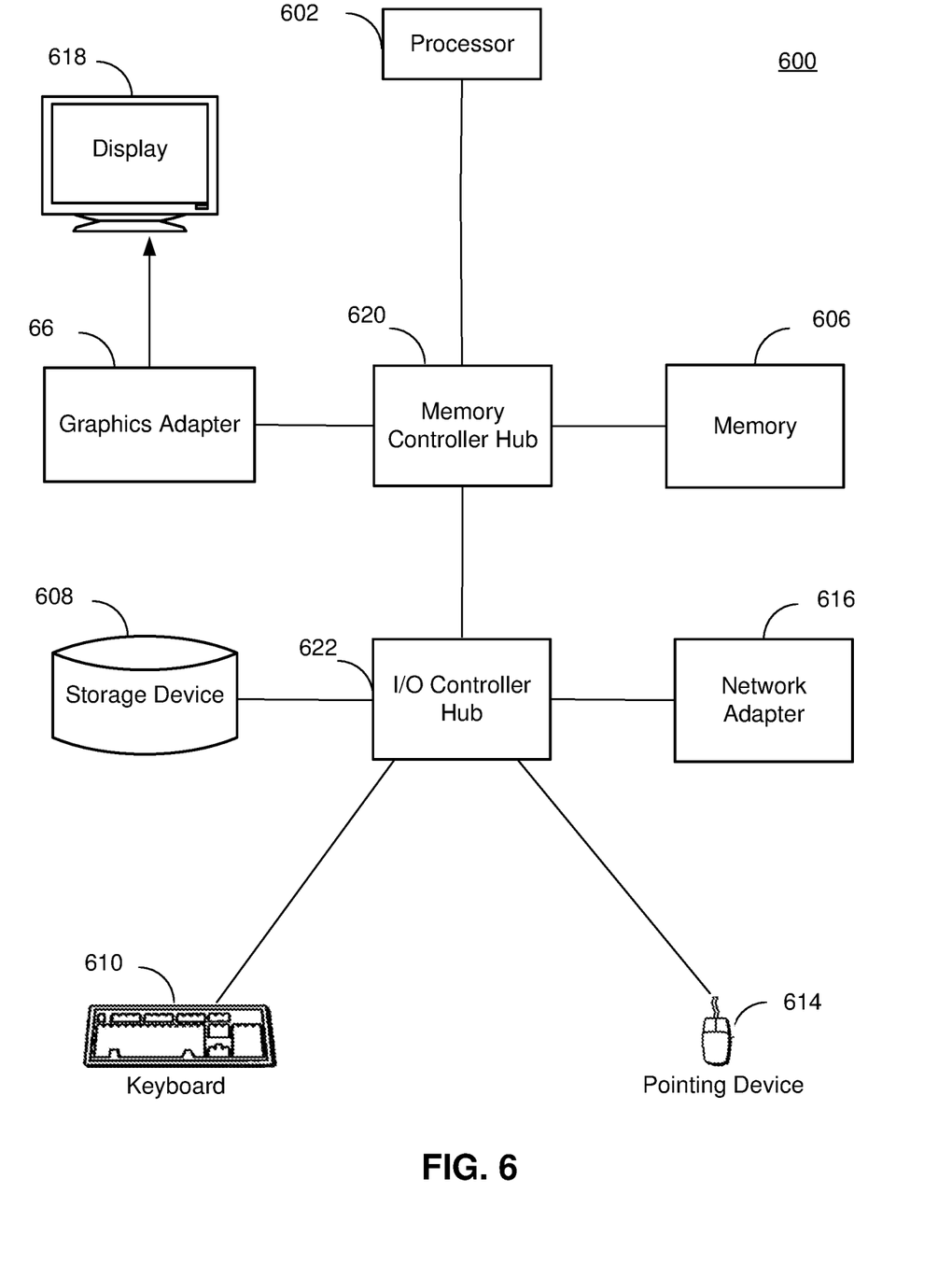
FIG. 6 shows an architecture of a computer that may be used for implementing a database system node, in accordance with an embodiment.

FIG. 6 is a high-level block diagram illustrating an example of a computer 600 for use as one or more of the entities illustrated in FIG. 1, according to one embodiment. Illustrated are at least one processor 602 coupled to a memory controller hub 620, which is also coupled to an input/output (I/O) controller hub 622. A memory 606 and a graphics adapter 612 are coupled to the memory controller hub 622, and a display device 618 is coupled to the graphics adapter 612. A storage device 608, keyboard 610, pointing device 614, and network adapter 616 are coupled to the I/O controller hub. The storage device may represent a network-attached disk, local and remote RAID, or a SAN (storage area network). A storage device 608, keyboard 610, pointing device 614, and network adapter 616 are coupled to the I/O controller hub 622. Other embodiments of the computer 600 have different architectures. For example, the memory is directly coupled to the processor in some embodiments, and there are multiple different levels of memory coupled to different components in other embodiments. Some embodiments also include multiple processors that are coupled to each other or via a memory controller hub.

The storage device 608 includes one or more non-transitory computer-readable storage media such as one or more hard drives, compact disk read-only memory (CD-ROM), DVD, or one or more solid-state memory devices. The memory holds instructions and data used by the processor 602. The pointing device 614 is used in combination with the keyboard to input data into the computer 600. The graphics adapter 612 displays images and other information on the display device 618. In some embodiments, the display device includes a touch screen capability for receiving user input and selections. One or more network adapters 616 couple the computer 600 to a network. Some embodiments of the computer have different and/or other components than those shown in FIG. 6. For example, the database system can be comprised of one or more servers that lack a display device, keyboard, pointing device, and other components, while a client device acting as a requester can be a server, a workstation, a notebook or desktop computer, a tablet computer, an embedded device, or a handheld device or mobile phone, or another type of computing device. The requester to the database system also can be another process or program on the same computer on which the database system operates.

The computer 600 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device, loaded into the memory, and executed by the processor.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention.

What is claimed is:

1. A computer-implemented method comprising:
    storing, by a database system, a mapping associating names and query versions of database queries to execution plans of database queries, the mapping associating a name of a database query and a first query version of the database query to a first execution plan of the database query;
    providing an endpoint for REST API requests for executing database queries, wherein a plurality of applications execute a particular execution plan of a particular database query by sending a REST API request, wherein each REST API request specifies a name of the particular database query and a particular query version;
    receiving from an application, a first REST API request for executing the database query, the first REST API request specifying the name of the database query, the first query version, and one or more parameters for the database query;
    accessing from the mapping, a first execution plan of the database query based on the name of the database query and the first query version received via the first REST API request;
    processing the first execution plan of the database query in response to the first REST API request;
    receiving a modification to the database query;
    storing in the mapping, an association between the name of the database query and a second query version with a second execution plan of the database query;
    receiving one or more REST API requests for testing the modified database query from one or more applications;
    responsive to the modified database query passing a test criterion, promoting the modified database query for use with production instances of the application;
    receiving a second REST API request from a production instance of the application, the second REST API request specifying the name of the database query, an second query version, and one or more parameters for the database query;
    accessing the second execution plan based on the name of the database query and the second query version received via the second REST API request; and
    processing the second execution plan of the database query in response to receiving the second REST API request.

2. The computer-implemented method of claim 1, further comprising:
    optimizing the modified database query to generate the second execution plan.

3. The computer-implemented method of claim 2, wherein optimizing the modified database query comprises:
    generating statistics for tables processed by the modified database query; and
    generating an execution plan for the modified database query, the second execution plan optimized based on the generated statistics.

4. The computer-implemented method of claim 2, wherein optimizing the modified database query comprises:
    generating an index of a table processed by the modified database query; and
    generating the second execution plan using the index.

5. The computer-implemented method of claim 1, wherein the database query is associated with a URL and the REST API request is sent using HTTP protocol via the URL.

6. The computer-implemented method of claim 1, wherein the application is a first application is based on a first programming language, the method further comprising:
    receiving a third REST API request from a second application based on a second programming language, the third REST API request specifying the name of the database query and the second query version; and
    executing the second execution plan of the database query in response to receiving the third REST API request.

7. The computer-implemented method of claim 1, further comprising:
    responsive to receiving the modification to the database query, generating a version identifier for the second version of the database query; and
    storing the second execution plan of the database query in association with the generated version identifier.

8. The computer-implemented method of claim 7, further comprising:
    receiving a user defined tag for identifying the second version of the database query; and
    storing the second execution plan of the database query in association with the user defined tag.

9. The computer-implemented method of claim 8, further comprising:
    storing a record for each version of the database query, the record including attributes comprising:
        a name of the database query;
        a generated identifier for a query version of the database query;
        a user defined tag for the database query; and
        a query text of the database query.

10. A non-transitory computer-readable storage medium storing instructions that when executed by one or more computer processors, cause the one or more computer processors to perform steps comprising:
  storing, by a database system, a mapping associating names and query versions of database queries to execution plans of database queries, the mapping associating a name of a database query and a first query version of the database query to a first execution plan of the database query;
  providing an endpoint for REST API requests for executing database queries, wherein a plurality of applications execute a particular execution plan of a particular database query by sending a REST API request, wherein each REST API request specifies a name of the particular database query and a particular query version;
  receiving from an application, a first REST API request for executing the database query, the first REST API request specifying the name of the database query, the first query version, and one or more parameters for the database query;
  accessing from the mapping, a first execution plan of the database query based on the name of the database query and the first query version received via the first REST API request;
  processing the first execution plan of the database query in response to the first REST API request;
  receiving a modification to the database query;
  storing in the mapping, an association between the name of the database query and a second query version with a second execution plan of the database query;
  receiving one or more REST API requests for testing the modified database query from one or more applications;
  responsive to the modified database query passing a test criterion, promoting the modified database query for use with production instances of the application;
  receiving a second REST API request from a production instance of the application, the second REST API request specifying the name of the database query, an second query version, and one or more parameters for the database query;
  accessing the second execution plan based on the name of the database query and the second query version received via the second REST API request; and
  processing the second execution plan of the database query in response to receiving the second REST API request.

11. The non-transitory computer-readable storage medium of claim 10, wherein the instructions further cause the one or more computers to perform steps comprising:
  optimizing the modified database query to generate the second execution plan.

12. The non-transitory computer-readable storage medium of claim 11, wherein optimizing the modified database query comprises:
  generating statistics for tables processed by the modified database query; and
  generating an execution plan for the modified database query, the second execution plan optimized based on the generated statistics.

13. The non-transitory computer-readable storage medium of claim 11, wherein optimizing the modified database query comprises:
  generating an index of a table processed by the modified database query; and
  generating the second execution plan using the index.

14. The non-transitory computer-readable storage medium of claim 10, wherein the database query is associated with a URL and the REST API request is sent using HTTP protocol via the URL.

15. The non-transitory computer-readable storage medium of claim 10, wherein the application is a first application is based on a first programming language, wherein the instructions further cause the one or more computers to perform steps comprising:
  receiving a third REST API request from a second application based on a second programming language, the third REST API request specifying the name of the database query and the second query version; and
  executing the second execution plan of the database query in response to receiving the third REST API request.

16. The non-transitory computer-readable storage medium of claim 10 wherein the instructions further cause the one or more computers to perform steps comprising:
  responsive to receiving the modification to the database query, generating a version identifier for the second version of the database query; and
  storing the second execution plan of the database query in association with the generated version identifier.

17. The non-transitory computer-readable storage medium of claim 16, wherein the instructions further cause the one or more computers to perform steps comprising:
  receiving a user defined tag for identifying the second version of the database query; and
  storing the second execution plan of the database query in association with the user defined tag.

18. The non-transitory computer-readable storage medium of claim 17, wherein the instructions further cause the one or more computers to perform steps comprising:
  storing a record for each version of the database query, the record including attributes comprising:
    a name of the database query;
    a generated identifier for a query version of the database query;
    a user defined tag for the database query; and
    a query text of the database query.

19. A computer system comprising:
  one or more computer processors; and
  a non-transitory computer-readable storage medium storing instructions that when executed by one or more computer processors, cause the one or more computer processors to perform steps comprising:
    storing, by a database system, a mapping associating names and query versions of database queries to execution plans of database queries, the mapping associating a name of a database query and a first query version of the database query to a first execution plan of the database query;
    providing an endpoint for REST API requests for executing database queries, wherein a plurality of applications execute a particular execution plan of a particular database query by sending a REST API request, wherein each REST API request specifies a name of the particular database query and a particular query version;
    receiving from an application, a first REST API request for executing the database query, the first REST API request specifying the name of the database query, the first query version, and one or more parameters for the database query;

accessing from the mapping, a first execution plan of the database query based on the name of the database query and the first query version received via the first REST API request;
processing the first execution plan of the database query in response to the first REST API request;
receiving a modification to the database query;
storing in the mapping, an association between the name of the database query and a second query version with a second execution plan of the database query;
receiving one or more REST API requests for testing the modified database query from one or more applications;
responsive to the modified database query passing a test criterion, promoting the modified database query for use with production instances of the application;
receiving a second REST API request from a production instance of the application, the second REST API request specifying the name of the database query, an second query version, and one or more parameters for the database query;
accessing the second execution plan based on the name of the database query and the second query version received via the second REST API request; and
processing the second execution plan of the database query in response to receiving the second REST API request.

20. The computer system of claim 19, wherein the instructions further cause the one or more computers to perform steps comprising:
responsive to receiving the modification to the database query, generating a version identifier for the second version of the database query; and
storing the second execution plan of the database query in association with the generated version identifier.

\* \* \* \* \*